US006405107B1

(12) United States Patent
Derman

(10) Patent No.: US 6,405,107 B1
(45) Date of Patent: Jun. 11, 2002

(54) VIRTUAL INSTRUMENT PILOT: AN IMPROVED METHOD AND SYSTEM FOR NAVIGATION AND CONTROL OF FIXED WING AIRCRAFT

(76) Inventor: Gary Derman, 55 Harding Rd., P.O. Box 1792, North Eastham, MA (US) 02651-1792

(*) Notice: Subject to any disclaimer, the term of this patent is extended or adjusted under 35 U.S.C. 154(b) by 0 days.

(21) Appl. No.: 09/759,190

(22) Filed: Jan. 11, 2001

(51) Int. Cl.⁷ .................. B64C 13/18; B64C 13/20; G05D 1/00; G05D 3/00; G06F 17/00; G06F 19/00
(52) U.S. Cl. .................. 701/3; 701/11; 701/14; 701/13; 701/33; 701/122; 345/1.3; 345/856; 340/3.5; 340/500; 340/825.72; 340/947; 340/948; 340/979; 340/971; 340/999; 340/975; 340/973; 342/357.08; 342/401; 342/49; 434/29; 434/38; 434/43
(58) Field of Search .................. 701/3, 14, 11, 701/13, 33, 301, 122, 121, 120; 345/1.3, 856; 244/1 R, 158 R; 340/3.5, 500, 825.72, 947, 948, 979, 971, 995, 975, 973; 455/66; 342/357.08, 401, 49; 434/29, 38, 43

(56) References Cited

U.S. PATENT DOCUMENTS

| 4,196,474 A | * | 4/1980 | Buchanan et al. .......... 701/301 |
| 4,209,768 A | | 6/1980 | Basov et al. |
| 4,326,189 A | * | 4/1982 | Crane .................. 340/973 |
| 4,767,334 A | * | 8/1988 | Thorne et al. ............ 43/29 |
| 5,153,836 A | * | 10/1992 | Fraughton ............... 701/301 |
| 5,296,861 A | * | 3/1994 | Knight .................. 342/357 |
| 5,610,600 A | * | 3/1997 | Koenig ................. 340/976 |
| 5,758,297 A | * | 5/1998 | Gaultier ................ 701/14 |
| 5,786,773 A | * | 7/1998 | Murphy ................. 340/947 |
| 5,801,659 A | * | 9/1998 | Helfrick ................ 342/357 |
| 5,945,943 A | | 8/1999 | Kalafus et al. |
| 6,031,488 A | | 2/2000 | Hua et al. |
| 6,057,786 A | | 5/2000 | Briffe et al. |
| 6,112,141 A | | 8/2000 | Briffe et al. |
| 6,119,055 A | | 9/2000 | Richman |
| 26,216 A1 | * | 10/2001 | Block |

* cited by examiner

Primary Examiner—William A. Cuchlinski, Jr.
Assistant Examiner—Ronnie Mancho

(57) ABSTRACT

A self contained electronic system for manual or automatic control and navigation of fixed winged aircraft using electronic position sensing such as GPS, DGPS, WAAS, and the like, as the primary sensor and making use of known flight characteristics of the aircraft to determine aircraft attitude without any interaction with the aircraft, its controls, or the outside environment and without any moving mechanical devices other than switches, dials and connectors. The automatic and visual interface between the system and the pilot provides for simplified flight controls, and a new solution to the hazard of disorientation, and will reduce the time needed for a pilot to become proficient in VFR and instrument flying. A single instrument replaces many of the conventional instruments used for flight. Navigation data is provided in an easy to understand graphical format. The pilot is told explicitly where to move aircraft controls. The absence of mechanical devices and presence of battery backup make the system extremely reliable and capable of continuing operation of the aircraft independent of the aircraft power or vacuum sources.

14 Claims, 9 Drawing Sheets

| OBS | ID/TYPE | POS | RNAV | LAT/LON |
|---|---|---|---|---|
| A | LFV | 19.8 | ----- | 42° 01.03' N |
| 016° | VOR | 010° | 016° | 70° 02.24' W |
| B | FMH | 23.6 | ----- | 41° 39.58' N |
| 016° | VOR | 282° | 016° | 70° 30.84' W |
| C | ACK | 24.8 | 1.0 | 41° 16.64' N |
| 016° | VOR | 201° | 270° | 70° 02.32' W |

FIG. 6

VIRTUAL INSTRUMENT PILOT: AN IMPROVED METHOD AND SYSTEM FOR NAVIGATION AND CONTROL OF FIXED WING AIRCRAFT

TECHNICAL FIELD

This invention describes a safer system of control and navigation of fixed wing aircraft. This development derives its accuracy from Satellite Global Positioning Systems (GPS). The Global Positioning Systems are generated by orbiting satellites which are located high above the earth. In some instances, a combination of satellites and supplementary ground systems, such as Wide Area Navigation Systems (WAAS), Differential GPS (DGPS), and the like may be employed to improve the overall navigation accuracy. The use of GPS systems in place of the usual radar and radio methods of navigation provides greatly improved four dimensional accuracy and simplicity of derived Instrument Landing Systems (ILS). The GPS derived ILS system of the present invention results in improved and more reliable flight safety over conventional ILS systems. In addition, a plurality of conventional flight and navigational instruments are replaced by a single compound instrument which provides accurate flight information in one display which is easy to understand. The flight instruments operate without vacuum or moving parts, eliminating the primary failure mechanisms for conventional devices.

BACKGROUND OF THE INVENTION

Note: When referencing to the pilot as a "he", it is understood that pilots can be of either sex. The terminology used, therefore, is generic in nature, and signifies any pilot.

When pilots learn to fly an aircraft, they first learn to fly by "Visual Flight Rules" (VFR). Under these rules, flight is limited to those weather conditions where good visibility exists. The reliance on flight instruments is minimal. Slowly, the pilot learns to handle his aircraft and to read and to rely on the other instruments on the control panel. He learns how to mentally relate these instrument readings to what the actual aircraft is doing. For example, by looking out the window, the pilot can tell which direction is toward the ground, but he usually cannot tell if the aircraft is actually going up or going down by feel or by sight, unless the relative changes in elevation are large. People who have flown over water can attest to the difficulty of determining how far above the water the aircraft is flying. Conventionally, a vertical velocity indicator instrument tells the pilot if the aircraft is going up or down and how fast the aircraft is gaining or losing altitude. The altimeter instrument tells the pilot how high he is above sea level. Airport elevations are reported as feet above sea level, and the altimeter instrument is vital in maintaining traffic separation and when making aircraft landings.

As the fledgling pilot advances in his art, he is able to depend upon his instruments to a greater extent. The pilot develops the ability to envision the flight of his aircraft in his mind.

Eventually, after examination by his instructor, the pilot becomes certified to fly under "Instrument Rules" (IFR). It is important to note that flying by instruments is not merely a convenience. Flying by instrument is actually a life-saving capability. Instruments are designed to assist the pilot in flying his aircraft in inclement weather, and under other adverse conditions. Unfortunately many pilots are intimidated by the instrument rating process and fail to learn this important flying skill.

Although the instruments eventually become the pilot's mainstay, they can and do fail. As a result, the pilot is usually taught how to fly his aircraft with one or more instruments malfunctioning. The instructor achieves this by covering the instrument of his choice and then exhorting the pilot to fly without the selected instrument. However, instrument availability would be a preferred solution.

If, for example, inclement weather closes in, and the pilot finds himself in the clouds, with little or no visibility, the only means of control that he has over his flight is by means of the aircraft instrumentation. Safe flight is then often not possible without dependence upon navigation and control instruments. Furthermore, if there is an instrument failure while the pilot is in the clouds or in a fog, the pilot may become disoriented and such situations often prove to be fatal.

Aware of these problems, engineers have worked to improve the science of flight. In order to improve the safety of flying, engineers have developed radio and radar based instrumentation systems which enable a pilot to land his aircraft safely even when conditions are far from ideal, or when the pilot is unfamiliar with the airport at which he is attempting to land. Such systems are called "Instrument Landing systems" (ILS), and they have been developed to make landing safer and to save lives. These ILS systems are replaced by the present invention which does not depend upon radio or radar navigation.

The directional and instrument landing systems which were initially developed were very primitive by today's standards. Instrument Landing Systems (ELS) have improved steadily over the past decades. These newer systems employ radar position sensing, multiple phased arrays, radar altimeters, radio transponders, Infra red imaging, holograms and other devices. Instead of listening to a tone or series of tones, the pilot now has a cross-hair display. In most ELS systems, there is a set of "cross hairs" which move up or down or to the right and left to indicate where the pilot's aircraft is located relative to the center of the "beam". This system is called a Glide Slope Indicator. By keeping the cross hairs centered in the display as he descends, the pilot knows that he is flying "On the Beam", correcting for errors in horizontal position and for errors in elevation. Thus, the pilot can execute a safe landing at a controlled airport. These systems are exemplified in the Prior Art described herein.

During the past decade, however, engineers have developed extremely accurate Global Positioning Systems (GPS). These location systems do not depend upon conventional radar or radio signals, but in their place, multiple satellites send high frequency signals to earth. These satellites are configured as a four dimensional Global Positioning System (GPS). Specialized localizers which are tuned to satellite frequencies can tell an operator precisely where and when he is on the surface of the earth with an accuracy of a few meters and less than a millisecond.

Present "inexpensive" GPS systems exhibit an accuracy of position of approximately 100 feet in all directions 95% of the time. WAAS and DGPS systems improve the accuracy down to the 25 foot range. Modern military GPS systems exhibit far greater accuracies. It is anticipated that the present invention will be able to be enhanced as more accurate GPS systems become available to the general public.

It is well known to those who fly, that modem GPS systems are very accurate. These systems are rapidly replacing LORAN and other systems which are presently used for navigation, but do not provide altitude information.

The present invention, which the inventor calls a "Virtual Instrument Pilot" utilizes the aforementioned Global Positioning Systems to tell the pilot precisely where he is located with respect to actual spatial positions on the surface of the earth and in the air. The present invention, however, goes further than simply using the GPS as a navigational aid. The system described herein uses the GPS as an input source by which a complete functional aircraft control system can be accomplished in a single unified instrument and displayed upon a single display, which is readily understood by the pilot.

The reliability of the present invention stems from the avoidance of any moving parts or parts which are exposed to the environment during data acquisition. The data input is also isolated from the rest of the aircraft instrumentation. The present invention provides the equivalent of most of the needed flight instruments for Attitude determination, navigational Aids, and route control functions of modern avionics in a single, reliable instrument. This minimizes the instrument visual scan by the pilot that is presently required with separate units. A partial list of functional items normally found in separate flight instruments follows. These are:

A) Aircraft attitude indicator, including an artificial horizon and aircraft model showing both bank and pitch angles.
B) Aircraft turn rate showing the rate relative to a standard (2 minute) turn in either direction.
C) Sensitive altimeter
D) Vertical velocity indicator
E) Compass
F) Air Speed indicator (Not instantaneous)
G) Blind altimeter (not on control panel, used by transponder)

The following instruments are found in aircraft navigational aids:

H) Distance from any established system or user defined navigational aid.
I) Bearing to any established system or user defined navigation aid.
J) Angular position relative to a specified bearing from any system or user defined navigation aid.
K) Ground speed.
L) Direction of flight.
M) Indication of deviation from pilot entered air speed and heading.
N) Calculation of wind vector from pilot entered air speed and heading.
O) Flight path determination from pre-stored data.

Additional functionality new in this system.

P) Calculation of wind vector from a simple maneuver without pilot input.
Q) Most functions (except connections to transponder and autopilot) are available in a portable unit which can be moved from one aircraft to another.
R) Ability to "learn" a runway. It is important to note that half of the 10,000 airports in this country are private and may not be on charts. The present invention will learn about a new airport runway by simply taking off from that runway. Once learned, the present invention will provide both pattern entry and ILS information to the pilot.

The present invention, therefore:

1) Provides the most needed flight indicators such as Attitude, Navigational Aids, and Route control functions of modern avionics are vested in a single, reliable instrument. This minimizes the instrument scan required by the pilot that is presently required with separate units.
2) The pilot has an accurate indication of his altitude and aircraft banking;
3) The instrument can replace many of those instruments currently required for flight management.
4) In an emergency, a simple "Panic Button" depression can cause the aircraft to recover to straight and level flight either automatically or via simple commands to the pilot. This feature is intended to recover an aircraft in which the pilot is hopelessly disoriented due to fog, inclement weather, or confusion.
5) From the invention display, the pilot knows what his ground speed is, and where his direction and flight path is relative to pre-defined locations (airports) or pre-entered flight paths;
6) The pilot can set or have the wind vector; calculated by the integral computer.
7) The pilot knows where he is located relative to previously selected travel plans;
8) The pilot can select and activate his flight path;
9) The present invention can be adapted to any fixed wing aircraft, has been designed to be portable, and can easily be moved from one aircraft to another.

When paired with a WAAS or DGPS sensor, the present invention is capable of replacing the functionality in normal flight of the following standard instruments: Attitude indicator, Sensitive altimeter, Rate of climb indicator, Gyrocompass, Rate of turn indicator, Compass (Both Analog and digital presentations of compass heading are displayed.), and Clock.

In this invention, the compass never has to be adjusted for drift, and the compass accuracy is not affected by any metal in the aircraft. The compass shows the direction of travel rather than the aircraft heading, and the compass accuracy is not affected by wind speed. In addition, the compass reading is presented to the pilot in a digital readout, eliminating the need for interpolation.

While there are many devices in the marketplace that perform various combinations of the functions enumerated herein, there are no instruments in which all of the functions are incorporated in a single unit.

When turned on, the invention provides simultaneous navigational information for marker beacons and up to three navigational aids. The instrument of the present invention will direct the pilot through maneuvers needed to execute preplanned flights, and landing patterns. The display of the present invention also shows an artificial horizon which differs from the conventional display in that the horizon is placed above or below cross hairs which represent the direction of flight rather than the pitch of the aircraft. The pitch of the aircraft can be seen by observing the height of the airplane figure above the artificial horizon. In this way, the pilot has an improved visual indication of whether he is climbing or descending.

An additional feature of the present invention is that the invention is also an integrated Instrument Landing System, displaying the conventional outer, middle, and inner marker beacon indicators. Virtual ILS indications are provided for runways which do not have an ILS system. These function in the normally expected manner and are used to indicate the necessary marker beacons and missed approach points, which the pilot is expecting to find in flight.

One other advantage of the Virtual Instrument Pilot is that conventional instruments rely upon the change in barometric pressure to tell the pilot when there is a change in vertical velocity. In these mechanical systems, the change is not reported for a period of between 6 to 9 seconds. In the Virtual Instrument Pilot of the present invention, the lag in vertical velocity readout is typically 1.5 to 3 seconds.

All of these functions are accomplished in an instrument can continue to function for an hour or more if all of the electrical and vacuum power in the aircraft fails.

One of the major advantages of the present invention is that it contains virtually all of the necessary instrumentation required to safely fly and navigate an aircraft anywhere in the world. These instruments are embodied in one convenient and independent package. The Virtual Instrument Pilot can function completely independent of the aircraft vacuum and power systems. In the event of a complete battery failure, the aircraft can continue to fly because the engines receive ignition energy from the engine magnetos. In the absence of all power, the Virtual Instrument Pilot of the present invention can continue to operate for a minimum of an hour on its own internal pre-charged batteries. The internal batteries are on continuous float charge while normal DC power is available. A transition-free connection to the internal batteries is made if normal power fails.

The system of the present invention can also automatically notify the pilot where he is, hat his latitude and longitude are, how far off course his aircraft is, and what his next heading is to be. If a pilot simply takes off from a new airport which is not in his database, the Virtual Instrument Pilot of the present invention "learns" to identify the airport which the pilot took off from, and the data is remembered and can be downloaded into another computer at the end of the flight.

As noted earlier herein, if inclement weather closes in, and the pilot finds himself in the clouds, the only means of control that he has over his flight is by means of the aircraft instrumentation. Safe flight often then becomes impossible without dependence upon navigation and control instruments. Furthermore, if there is an instrument failure while the pilot is in the clouds or in a fog, the pilot may become disoriented and such situations can prove to be fatal. Very experienced pilots have been known to crash under these conditions. The present invention has been designed to eliminate and prevent such crashes.

The present invention, which is called a "Virtual Instrument Pilot", utilizes the aforementioned Global Positioning Systems to tell the pilot precisely where he is located with respect to known airports. The present invention will also tell the pilot which direction he is flying, what his altitude is, what his ground speed is, what his bank angle is, what his pitch is, and where his position is relative to pre-defined locations (airports), and where he is located relative to previously selected travel plans. Wind vectors are computed from either manual input of airspeed and heading of after a simple circular maneuver is executed.

One of the major advantages of the present invention is that it contains most of the necessary instrumentation required to safely fly and navigate an aircraft, and can function completely independent of the aircraft vacuum and power systems.

The present invention continually indicates the aircraft position over the surface of the earth (including over the seas). The invention can automatically tell the pilot how far off course his aircraft is, where his next heading is to be, and how to move his controls in order to restore his aircraft to the pre-determined flight path. This information only partially available on present navigation and ILS systems.

Although this invention has been shown and described with respect to detailed embodiments thereof, it will be understood by those skilled in the art that various changes in form and detail may be made without departing from the spirit and scope of the claimed invention.

OBJECTS OF THE INVENTION

The primary object of the invention is to provide clear, easy to understand flight information to the pilot and to aid in a safe and efficient flight. A major object of this invention, therefore, is that; while using the Global Positioning System (GPS) as a source of continuous data, The Virtual Instrument Pilot can derive the following flight functions directly or by *mathematical computation: Latitude, Longitude, Altitude, Time, ground speed, vertical velocity, direction of travel, aircraft bank, aircraft pitch, wind vector, air speed, distance from a navigational reference, bearing to a navigational reference, relative direction of omni-bearing from navigational references, vertical and horizontal position along a glide path, physical maneuver to achieve destination at a specified altitude-speed-direction, and the control motion required to achieve the desired flight path.

All of the above indicators of flight are derived without the use of "conventional" mechanical, electrical, or vacuum operated instruments.

It is another object of the invention to provide an improved approach for the pilot and/or autopilot enabling the pilot to make a safe landing under unusual flying conditions.

It is a further object of this invention to reduce the effects of disorientation, which often occurs with conventional instrumentation, by replacing these instruments with a single unified instrument having attitude, position, and command information immediately and continuously visible. The graphical command information will guide the pilot's actions until he has regained his orientation. The ease of this operation is described herein.

Pilots must be able to deviate from the pre-planned path due to traffic control, weather or other difficulties. Current non-directional Beacons (NDB) are not expected to phase out until the year 2005, and Vector Omni Range (VOR/Distance Measuring Equipment (DME) are not expected to be phased out until the year 2010. Rather than eliminate current instrumentation, the system will also incorporate all of the instrument functions which are described herein In a single unified display.

Another object of this invention is to provide a navigation and control device which is free from failure due to mechanical, environmental, or power source factors. Units that are powered by vacuum systems are prone to failure due to corrosion if moisture gets into the system. Units that are powered by the electrical system usually fail when power is lost.

Instrument failures can be dangerous. For example, if the attitude indicator fails or "tumbles", the pilot must determine the aircraft's attitude from a number of other instruments. The loss of the attitude indicator and the resulting disorientation present a real danger of loss of life. In addition, autopilots obtain feedback information from the vacuum operated attitude indicator, and the autopilot could react violently to a failed attitude indicator, with the potential for an uncontrollable crash of the aircraft.

The invention will provide a unique approach to directing the pilot and dealing with disorientation. Much has been done in recent years to deal with this problem. Most approaches involve trying to make the instrument view of the flight situation as "real" as possible so that someone with less ability for spatial relations will more easily see and be able to correct the situation. While that approach might help, this invention intends to bypass the interpretation problem. The pilot will be presented with a direct solution to control and navigation of the aircraft, telling him or her which way and how much to move the controls in order to achieve the desired flight path correction.

It is a farther object of this invention whereby should the pilot become disoriented, the simple press of a single button will activate directions to the pilot (or autopilot) for the correct maneuver to return the aircraft to straight and level flight. A pilot who experiences a complete loss of visibility due to fog or other impediment, can "right" his aircraft by simply pressing a panic button. If autopilot equipped, the system of the present invention will take over control of the aircraft. If not, the present invention will present easily understood simple graphical instructions to the pilot for immediate flight correction. The aircraft will be righted and be set on a straight and level path.

Another object of the invention is to provide explicit and easy to understand directions for standard Instrument Flight Rules (IFR) and Visual Flight Rules (VFR) approaches to airports, for holding patterns, for pilot defined flight paths, for standard search and rescue patterns, for paths that are pre-defined in flight, or for pre-loaded user defined flight paths.

Another object of the invention described herein is to learn the necessary information about the flight from data gathered by the Virtual Instrument Pilot during flight. The present invention is capable of "learning" a new airport simply from data gathered during takeoff by the pilot.

Another object of the invention is to keep the computer architecture open, allowing for other systems to utilize the same hardware and display. Control panel clutter reduction is another major goal of this invention. In general, where desired, total redundancy can be achieved by installing two units in an aircraft. By sharing the hardware resources with other products that could be turned off if a system fails, we eliminate waste and keep the control panel simple.

It is an object of the present invention to provide a safer system for navigation and control of a fixed wing aircraft which is based upon the use of orbiting satellites, deriving flight information from a Global Positioning System.(GPS), Wide Area Augmentation System (WAAS), or from Differential Global Positioning System (DGPS).

Another object of the invention is to provide an improved Instrument landing System (ILS) in which spatial locations are derived without the use of conventional radar, radio, or standard communication methods. After the airport data is entered into the onboard computer, or the airport data is learned by the system, the pilot can find his way back to the airport and approach landing there, by utilizing the internal navigational and ILS system aids of the present invention.

Another object of the invention is to provide an instrument employing a single unified display which tells the pilot all the information that he requires to achieve safe flight. The reduction of panel clutter is an important improvement in flying.

Another object is to provide a single instrument which serves as an Instrument landing system, a glide slope indicator, a global positioning system, and a flight controller.

Another object of the invention is to provide a navigation and control system which can function if all of the electrical power and vacuum power on the aircraft fails. Operation, of the Virtual Instrument Pilot will be powered by internal batteries which will be functional for a minimum of one hour after a complete power failure. It is expected that within one hour, the pilot can locate and land his disabled aircraft at an airport where he can obtain the needed assistance to correct his aircraft failure.

A major object of this invention, defined earlier, is that; by using the Global Positioning System (GPS) as a source of continuous data, we can derive the following flight functions directly by mathematical computation based solely upon the derived data: Latitude, Longitude, Altitude, Time, ground speed, vertical velocity, direction of travel, aircraft bank, aircraft pitch, wind vector, air speed, distance from a navigational reference, bearing to a navigational reference, relative direction of omni-bearing from navigational references, vertical and horizontal position along a glide path, physical maneuver to achieve destination at a specified altitude-speed-direction, and the control motion required to achieve the desired path.

The necessary mathematical equations to solve the above elements during flight are included in the Best Mode for carrying out the invention.

PRIOR ART

There are very many patents which relate to aircraft management and control. Some of the more relevant specimens of recent prior art are indicated here. Old prior art appears not to be relevant to this application, due to advances in instrumentation technology.

U.S. Pat. No. 4,209,768 issued to Basov et al. On Jun. 24, 1980. AIRCRAFT TAKE-OFF AND LANDING SYSTEM AND METHOD FOR USING SAME. This patent describes the use of pencil-thin electromagnetic radio beams which are directed to assist takeoffs and landings of aircraft.

U.S. Pat. No. 6,119,055 issued to Richman on Sep. 12, 2000 REAL TIME IMAGING SYSTEM AND METHOD FOR USE IN AIDING A LANDING OPERATION OF AN AIRCRAFT IN OBSCURED WEATHER CONDITIONS. This patent comprises a CCD camera located on the aircraft and a plurality of synchronized radiant energy sources and LED assemblies located adjacent to the airport. A processor digitally filters information which enhances the view of the aircraft landing area. Additionally, there are LED assemblies located on an aircraft mounted display. These LED's represent the topology of the runway on the ground, thus providing a simulated image of the runway which is heretofore invisible to the pilot due to obscuring weather. The system is a visual aid to performing a landing procedure in inclement weather.

U.S. Pat. No. 6,112,141, issued to Briffe et al on Aug. 29, 2000 APPARATUS AND METHOD FOR GRAPHICALLY ORIENTED AIRCRAFT AND CONTROL. In this invention, a plurality of flat panel displays are utilized to represent the flight patterns of known aircraft. Separately identifiable cursors are used to manipulate aircraft flight paths, and the system may be engaged to control the flight paths of known aircraft in order to maximize flight safety.

U.S. Pat. No. 6,057,786 issued to Brife et al, on May 2, 2000 APPARATUS AND METHOD FOR AIRCRAFT DISPLAY AND CONTROL INCLUDING HEADS-UP DISPLAY. This invention the pilot can view his flight information by looking through the aircraft window. He obtains information on aircraft velocity vector, desired aircraft velocity, acceleration, and pitch. The on board computer generates a waypoint icon in the path of view of the geographic location and altitude of the actual way point.

U.S. Pat. No. 6,031,488 Issued to Hua et al, on Feb. 29, 2000 METHOD AND SYSTEM FOR AN EFFICIENT LOW COST PPS GPS RECEIVER This invention describes a system for using Precise Positioning Service signals from a Global Positioning System . A second GPS system is also used to analyze the data to obtain positioning data.

U.S. Pat. No. 5,945,943 Issued to Kalafus et al, On Aug. 31, 1999. SYSTEM FOR USING DIFFERENTIAL GPS RECEIVERS WITH AUTOPILOT SYSTEMS FOR CATEGORY III PRECISION APPROACHES. The referenced invention describes the use of a plurality of Differential Global Positioning receivers (DGPS) to obtain information which can be used for precision landing data.

Disclosure of the Invention

This invention is a complete system which will provide continuous graphical directions to the pilot of an aircraft to enable him to fly pre-defined flight paths. For paths which have not been entered into the system, the presentation of more traditional instruments may be utilized. The invention described herein, which is embodied in a single graphical display, will partially or fully replace the standard instrument functionality, as shown in table 1. It is important to note that all instrumentation is derived from a Global Positioning System, computation of derived data, and is totally independent of conventional instrumentation which is powered by the aircraft battery system and aircraft vacuum systems. Failure of the aircraft power and vacuum systems will not have any effect on the present invention, which can operate for an hour or greater upon failure of the aircraft power or vacuum systems.

The following mnemonic abbreviations are used in this specification, and are known to all pilots.

```
GPS     = Global Positioning System
DGPS    = Differential Global Positioning System
WAAS    = Wide Area Augmentation System
ATC     = Air Traffic Control
MDA     = Minimum Decent Altitude
MAP     = Missed Approach Point
VOR     = Vector Omni Range
RNAV    = Area Navigation
ADF     = Automatic Direction Finder
LORAN   = Long Range Navigation
```

TABLE 1

Traditional Instrument Capabilities

| Instrument | Functionality | Differences From Standard Instruments |
|---|---|---|
| Altimeter | Full | Adjustment no longer needed for barometric pressure<br>Precision depends on rate / accuracy of position sensor |
| Reporting Altimeter | Modified | ATC needs to know not to apply pressure correction |
| Rate of Climb Indicator | Full | Precision depends on rate / accuracy of position sensor |
| Attitude indicator | Modified | Coordinated flight required (minimum slip or skid)<br>Also shows angle of climb and speed<br>Provides electrical output for autopilot feedback |
| Heading Indicator | Modified | Shows actual heading rather than aircraft pointing<br>Pilot may select magnetic or true<br>Does not function when standing still |
| Turn and Slip Indicator | Partial<br>Turn enhanced | No slip - add simple bubble level to the system<br>No longer requires coordinated turn |
| Rate-of-turn | Partial | No slip - suggest simple bubble |

TABLE 1-continued

Traditional Instrument Capabilities

| Instrument | Functionality | Differences From Standard Instruments |
|---|---|---|
| Indicator | Turn enhanced | level be added to system<br>No longer requires coordinated turn |
| Air Speed | Approximate | Manually entered wind vector or calculated average |
| Clock | Full | Continuously synchronized with national standard |
| ILS Indicators | Enhanced<br>MDA<br>MAP | Actual and system defined<br>Minimum Decent Altitude<br>Missed Approach Point |
| Marker Beacon | Full | Both Audio and display Identifier |
| Non-Directional Beacon | Full plus | Same as advanced navigation |
| Vector Omni Range | Full plus | Same as advanced navigation |
| Advanced Navigation | All types | Marker Beacon, VOR, RNAV, ADF, LORAN, & GPS |
| Navigation Functions | Enhanced | Disorientation lifeline,<br>Automatically learns airport data |

BRIEF DESCRIPTION OF THE DRAWINGS

The foregoing and other features of the present invention will become more apparent from the following description and accompanying drawings.

FIG. 6 illustrates the Navigation Display in the present system. In most applications, this display is located directly under the Instrument Display of FIGS. 2, 3, and 4 for the economic advantage of sharing a display screen. However, there is no reason that it could not be placed separately in a more convenient location.

FIG. 8 is provided to illustrate the in flight derivation of physically realizable flight paths between an entry and exit snapshot. A snapshot is defined as the position, time, speed and direction of an aircraft. A direct segment consists of two arcs connected by a straight line. Four snapshot to snapshot segments are shown as (*a*), (*b*), (*c*), and (*d*).

BEST MODE FOR CARRYING OUT THE INVENTION

The Virtual Instrument Pilot, (this invention) provides three main functions: 1) aircraft instrumentation, 2) Aircraft navigation information, and 3) Automatic (or directed) Pilot. As long as satellite information is available, the system always displays instrument data.

The invention provides functional equivalents of the most important flight instruments, which are necessary to safely fly and control an aircraft. These include standard barometric instruments such as altimeter or rate of climb indicator as well as gyroscopic instruments such as the attitude indicator, heading indicator, or rate of turn indicator. These instrument functions are displayed in a single sealed non-mechanical unit. There are no mechanical moving parts or vacuum operated internal systems which can fail. The unit contains a battery backup so that the device itself remains operational for up to one hour after a total primary battery failure. Note that an aircraft may continue to fly if the primary battery fails because the magnetos supply ignition for the engine or engines. The display panel of the present invention should be installed directly in front of the pilot.

The hardware architecture of the system lends itself to those that are found in most portable personal computers. Differences from this architecture are as follows: 1) a small bright display is used to both fit on the instrument panel and be easily seen in the high ambient light found in aircraft cockpits. The display brightness is automatically adjusted for ambient light. 2) the keyboard is replaced by a set of high reliability knobs and switches, and 3) electronic non-volatile memories are used in place of hard drives, Compact Disks (CDs), or floppy drives to eliminate mechanical moving parts. Sensory information is received from a Global Positioning System (GPS), Differential GPS (DGPS), Wide Area Augmentation System (WAAS), or other position sensing sub-system. The sensory sub-system must provide, at a minimum: time, latitude, longitude, and altitude. If provided, the system will also make use of derived information such as direction, speed, and magnetic deviation. The accuracy of the system will depend on the sensory device used.

Figure 1:
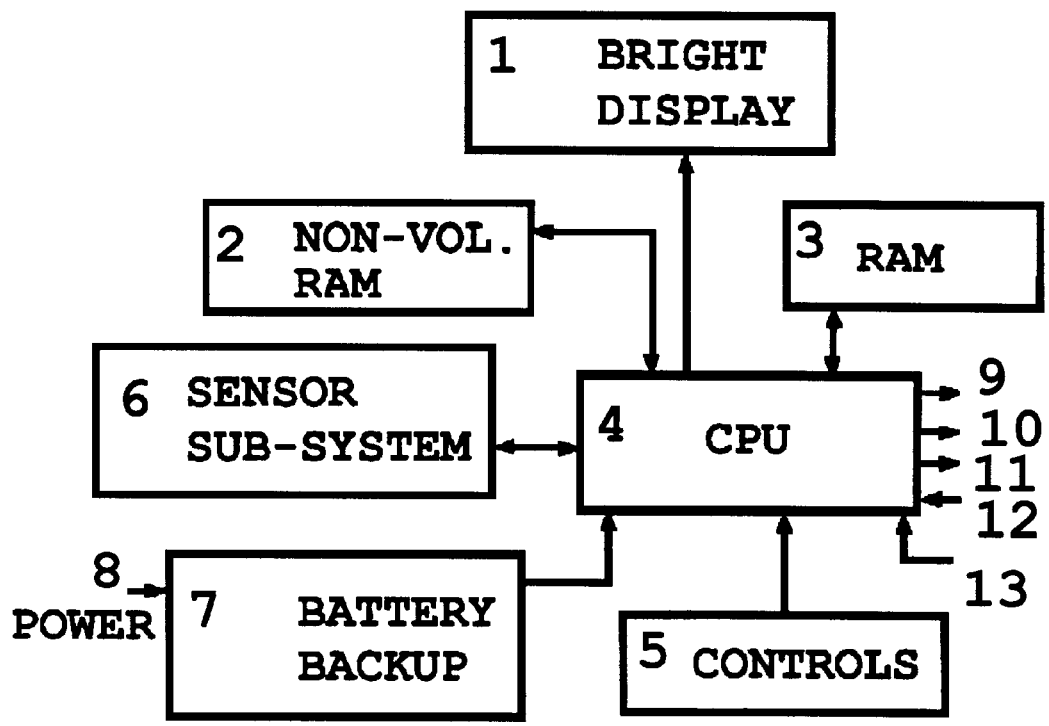
FIG. 1 shows a diagram of the hardware architecture of the system. The current system contains all of the functions that are shown.

The basic system block diagram is illustrated in FIG. 1. The elements in this figure are as follows: The bright display (1) presents all of the functional elements described herein. The pilot uses this single non-mechanical instrument to fly the aircraft. Flight altitude and attitude are shown, as are the latitude and longitude, the compass, the flight path, the aircraft direction of flight, the ELS markers, ground speed, air speed, maximum flap speed, wind vector, time, artificial horizon, and standard rate turn. In this invention, the pilot no longer has to visually scan an entire panel of instruments in order to understand what his aircraft is doing. Most information needed to execute a safe flight is before him. FIG. 1 also depicts the CPU (4) or Central Processing Unit. In this embodiment, a conventional computer is employed, currently of the Pentium III, 233 MHZ class. The higher speed CPU is desired in order for the Virtual Instrument Pilot to be able to execute flight commands within a few thousandths of a second. On board RAM (3) contains all program and dynamic data for flight control. The non-Volatile RAM (2) is used to store programs and static data. The manual controls (5) provide a point of entry for control of the invention as well as specific flight data required by the pilot. These include Way point information which is required by the on-board computer. The sensor subsystem is the GPS, DGPS, WAAS, or other position sensor (6) included in the system. In flight, data is continuously supplied by the position sensor. External power from 12 volts through and including 48 volts is applied to the system at (8). Input voltage is filtered and regulated, and used to charge a local internal battery system (7). The regulated output voltage is used to power the CPU display, and ancillary electronics.

Upon failure of the primary aircraft power, the internal battery, which has been maintained on float charge, is used to provide power for the Virtual Instrument Pilot electronics. The battery may also be used during preflight to achieve satellite acquisition before aircraft engine run-up. The battery is sized to provide a minimum of one hour of full operation. The battery may be selected and sized to provide any degree of operation, but it is felt that an hour is a good compromise between battery size and operating time. If an auxiliary battery is employed, run time can be greatly extended as the basic system is not thermally limited.

Data is supplied to the system through several ports. Blind altimeter data is supplied to the aircraft transponder through port (9). Output to the aircraft autopilot is obtained from port (10). Audio output which drives either speakers or headphones is derived from port (11). Finally, an external standard computer can be used to input pre-flight plans, way points, and other information needed to establish a flight plan. The computer is connected by means of a serial or parallel bidirectional port (12). A spare or auxiliary data line or lines (13) are also provided for future expansion.

The system, shown in FIG. 1, will accept location point, location point updates, and either relative or absolute flight path information in an easy to understand textual form from an external source such as a portable Personal Computer (PC). The data received will allow generic and specified airport approaches, preplanned flight routes, and generic patterns, such as search and rescue, to be followed by the aircraft.

The invention is also equipped with satellite sensing software. When first turned on, the system does a self-check and then looks for navigation satellites. A sky map will be displayed, showing the current location of satellites and their relative signal strengths. After the acquisition period of time, ranging from a few seconds to a few minutes, the instrument display will replace the sky map. Acquisition requires that at least 4 satellites are "seen" by the system.

In today's systems, a pilot flying on instruments, must maintain a mental image of the attitude and motion of the aircraft as well as its position relative to a number of fixes, navigational aids, pre-defined airways, and airports. The pilot continuously interprets this information from a plurality of instruments to determine what actions need to be taken in order to achieve a desired flight path. The pilot must know where he is, his ground speed, airspeed, altitude, and what direction to fly in order to get to his destination.

Figure 2:
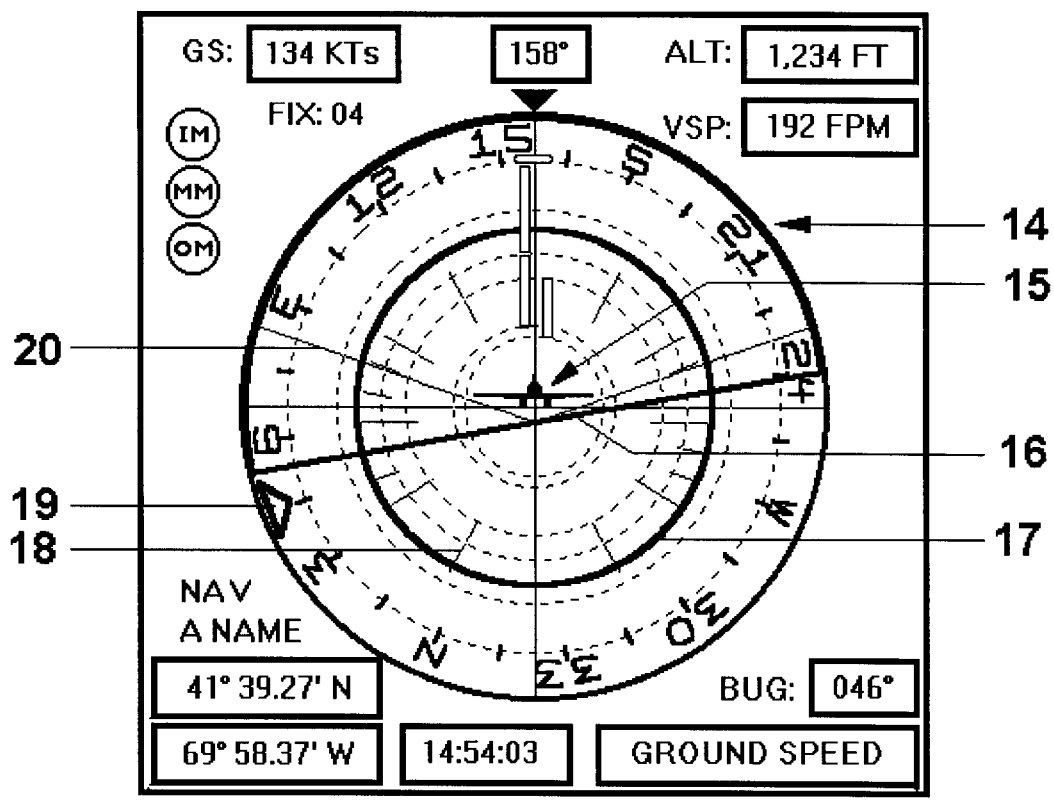
FIG. 2 illustrates the Instrument Display in the present system with all optional elements turned off. For the sake of brevity and simplicity, the figure is repeated in the next two illustrations. Only the graphical elements that change due to flight are numerically illustrated in this figure.

FIG. 2 illustrates the Instrument Display of the present invention. This figure shows the conventional elements which are found in standard flight instruments, with which all pilots are very familiar. For ease of understanding, only the graphic elements which change dynamically during flight are numerically in this figure as follows: The outer circle of the display (14) is the conventional Compass Rose. Around the periphery are the standard 360 degrees of the compass, with the cardinal points and other 30 degree positions indicated. As on the standard compass rose, degrees are indicated in tens Units. For example, 30=300 degrees. Additional 15 degree position markings are also provided.

FIG. 2 also illustrates a symbolic aircraft (15), the artificial horizon (16), the bank indicators (18), and a heading "bug" (19). These indicators are well known to any pilot. New to this display are the speed circle (17) and the standard rate turn indicator (20). The speed circle (17) expands and contracts proportional to either the aircraft ground speed, if no wind vector is present, or the aircraft air speed. The standard rate turn bank angle (20) adjusts itself to show the bank required to make a standard rate (2 minute) turn at the aircraft speed.

Figure 3:
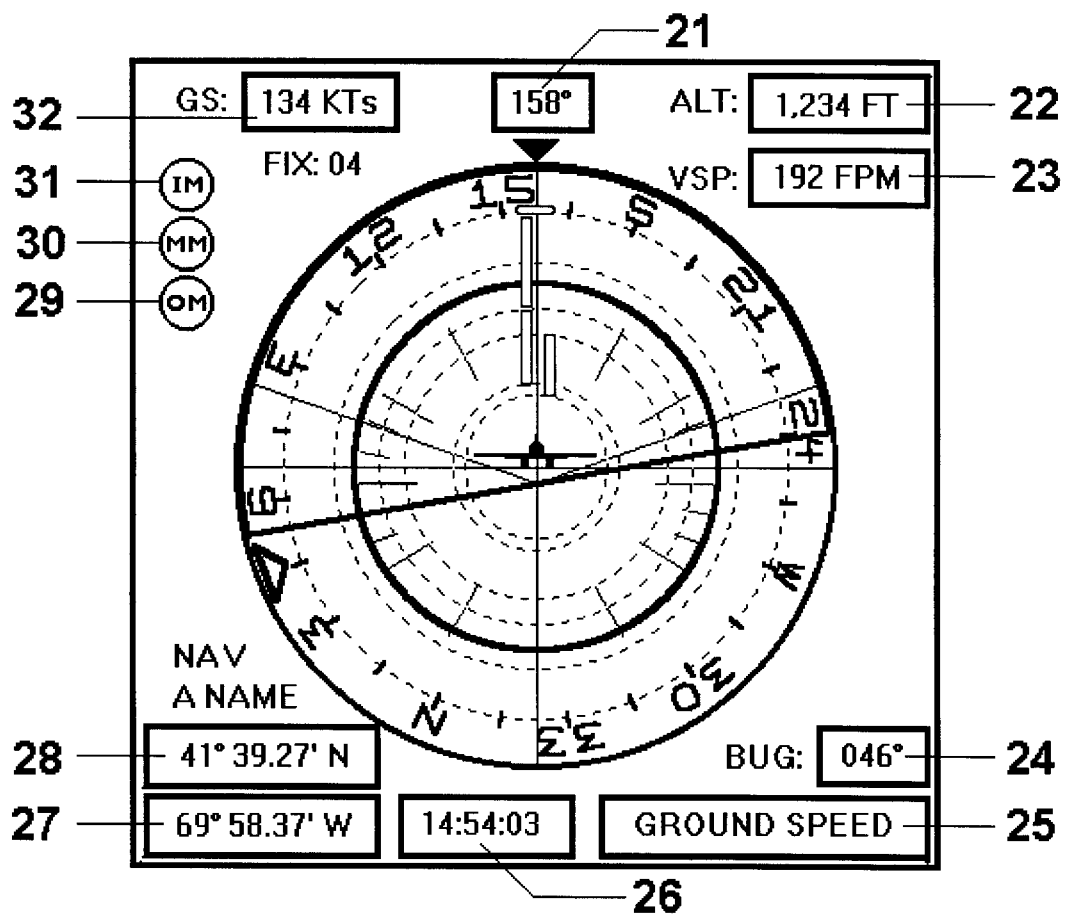
FIG. 3 is the same Instrument Display as FIG. 2. The alphanumeric elements that change due to flight are numerically illustrated.

FIG. 3 is the same as FIG. 2, but the alphanumeric readouts on the Instrument Display are further expanded and defined. In this figure, we find the direction of travel (21), he altitude of the aircraft (22), and the vertical speed (23). The vertical speed indicator changes sign to tell the pilot whether he is flying up (increasing altitude) or down (decreasing altitude), and indicates how fast he is rising or descending. In this figure we also find the BUG direction indicator (24) which corresponds to the position of the graphic bug on the compass rose. The ground speed or wind speed display (25) will simply say "Ground Speed" unless a wind vector has been entered as described later in this text. The current time (26) is displayed in 24 hour time. The aircraft longitude (27) and aircraft Latitude (28) are shown in the lower left corner of the display. The ILS outer marker (29), the ILS middle marker (30) the ILS inner marker (31) will flash if the aircraft is over one of these navigational aids (or a corresponding system generated navigational aid). The Aircraft ground speed (32) is shown in Knots.

Figure 4:
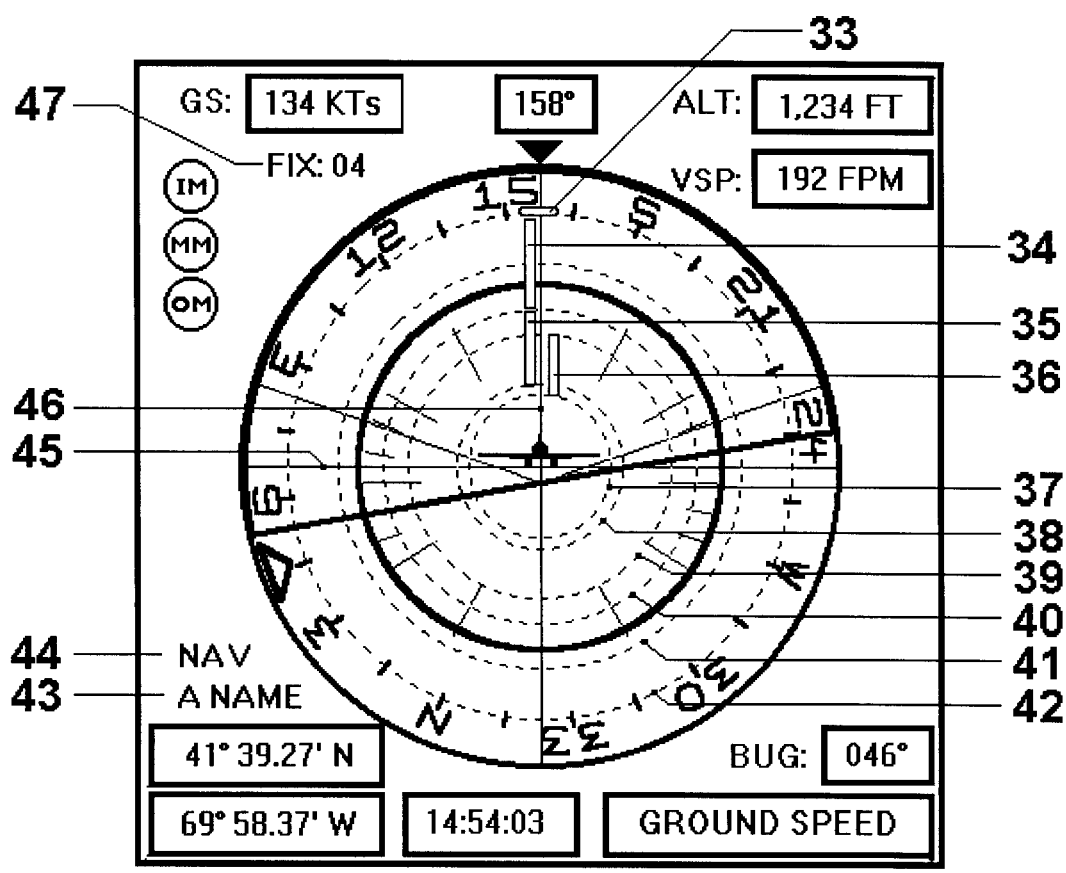
FIG. 4 is the same Instrument Display as FIG. 2. The static graphic elements, most of which may be modified by adaptation, and the system control alphanumeric elements are numerically illustrated.

FIG. 4 is also a duplicate of FIG. 2 with the remaining graphical elements as well as the system control alphanumeric readouts are numerically illustrated. There are a number of air speeds that are critical to the safety of flight. While the pilot should still depend on an air speed indicator when operating near these values, they are provided as dashed circles on the display for comparison with the current aircraft speed. The values of critical aircraft speeds are adaptable and will vary with type and model of aircraft. The speeds shown in FIG. 4 are:

Vso—Stall Speed, Flap Down (37)
Vsi—Stall Speed, Flap Up (38)
Vfe—Maximum Speed, Flap Down (39)
Va—Maneuvering Speed (40)
Vno—Maximum Speed, Normal (41)
Vne—Never Exceed Speed (42)

In addition, conventional aircraft air speed meters have colored markings, as does this Instrument Display for:

Red Line—at Vne (33)
Yellow Line—from Va to Vne (34)
Green Line—from Vsi to Va (35)
White Line—from Vso to Vfe (36)

To provide a reference for bank and pitch, the Instrument display has a Horizontal Cross Hair (45) and a Vertical Cross Hair (46).

The health of the position sensor (47) is always displayed on the Instrument Display. In addition, the Instrument Display always shows the current mode (44) of the system. For most functions, the selected control function (43) is also shown on the Instrument Display.

Figure 5:
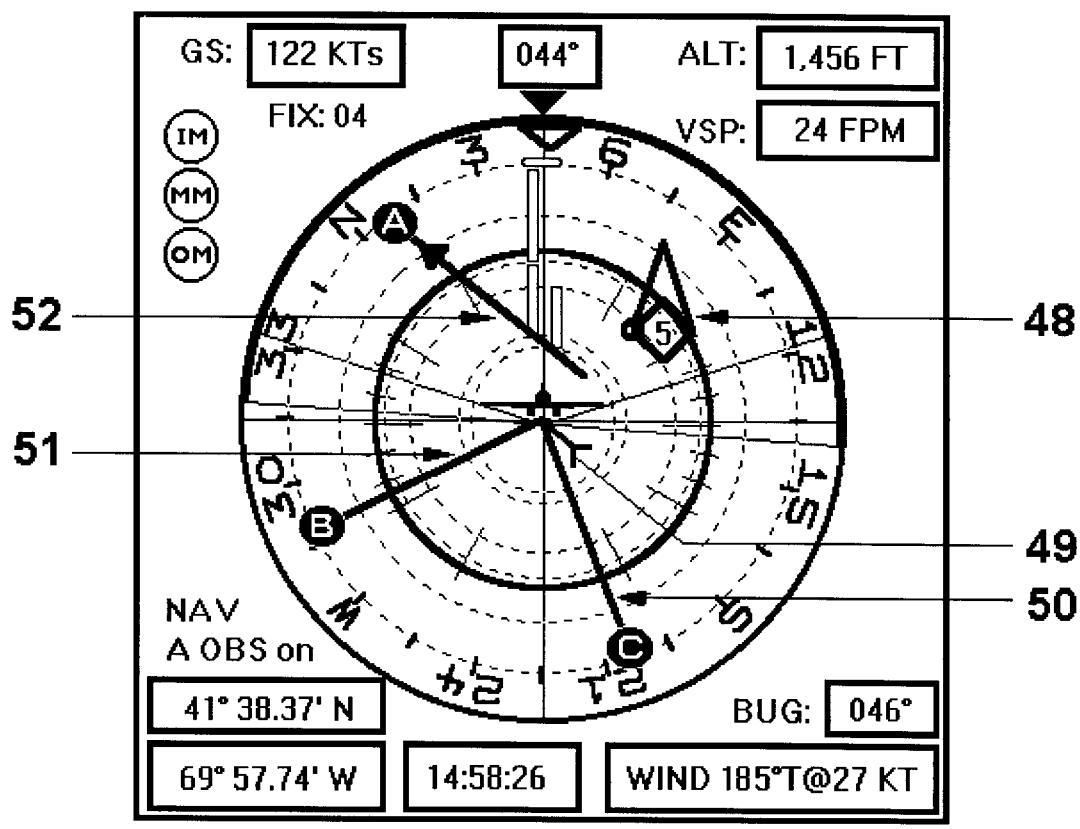
FIG. 5 illustrates the basic Flight Instrument Display with optional navigation aids activated. The navigation aids are numerically illustrated. In this figure, they include the "Aim" figure, one Vector Omni Range (VOR) (A), and two Automatic Direction Finders. (ADF) (B&C).

FIG. 5 Shows the Instrument Display with optional navigation aids and the "Aim" figure turned on. Each of these navigational aid figures may be controlled separately by the control panel which will be described in FIG. 7.

On the standard compass rose in FIG. 5, we find the "Aim" figure (48) in which the countdown numeral is displayed (as a number 5 in this illustration). The extended triangle on the top indicates that the pilot needs to increase the throttle. The small circle on the left side indicates that a turn to the left is imminent, in this case, in 5 seconds.

FIG. 5 also show three navigational aids. The label of VOR A (52) on the compass rose indicates that the navigational aid is located in a direction that is 10 degrees east of North. The small arrow on the line indicates that the Omni-bearing setting for this navigational aid is in a direction toward the navigational aid. The line indicates that to get on the selected radial (omni-bearing) to the navigational aid, the pilot would have to fly to the right of that heading. The labels to ADF B (51) and ADF C (50) indicate the relative location of each navigational aid, but the absence of the arrow indicates that the navigational aid is being looked at as an ADF, and the vector to that aid will be directly from the center of the display.

Navigational Aid data, supplied by the FAA has been incorporated into the Virtual Instrument Pilot database. All locations, airports, NDB's, VOR's, fixes, or user defined locations may be used as either ADF locations (vectors direct to aid) or VOR's with Omni Bearing selectors (OBS's). Distance measuring equipment (DME) information is also provided for all facilities on the Navigation Display.

FIG. 6 is the Navigation Display. It is one of several displays which may occupy the Virtual Instrument Pilot secondary window. The Navigation Display provides detailed information on the status of each (up to 3) selected navigational aid. The Latitude (53) and Longitude (54) of the specified aid is shown. The location of that aid relative to a selected navigational aid is shown as range (55) and bearing (56) from that navigational aid. The relative position of the aid from the aircraft is updated once per second and is shown as range (57) and bearing (58). These updates continue, showing range and bearing even if the pilot has chosen not to have that specific navigational aid displayed in its graphic form as shown in FIG. 5.

The identifier of the selected aid (59) and the type of aid (60) are shown. Note that the type only determines which database the identifier refers to. Every aid (except ILS) may be treated as either a VOR or an NDB. If the aid is being used as a VOR, then the Omni-bearing (radial) to be displayed is shown (62). The graphical presentation of that VOR will have the same Label (61) as shown on this display. These fields of information are repeated for each selected navigational aid as shown for A (63), B, or C (numerically illustrated).

The Navigation Display shares its window with other textual data displays such as flight path, runway selection, or adaptation. While the window is in use for another function, the graphical presentation of each navigational aid will continue to function (if turned on).

Figure 7:
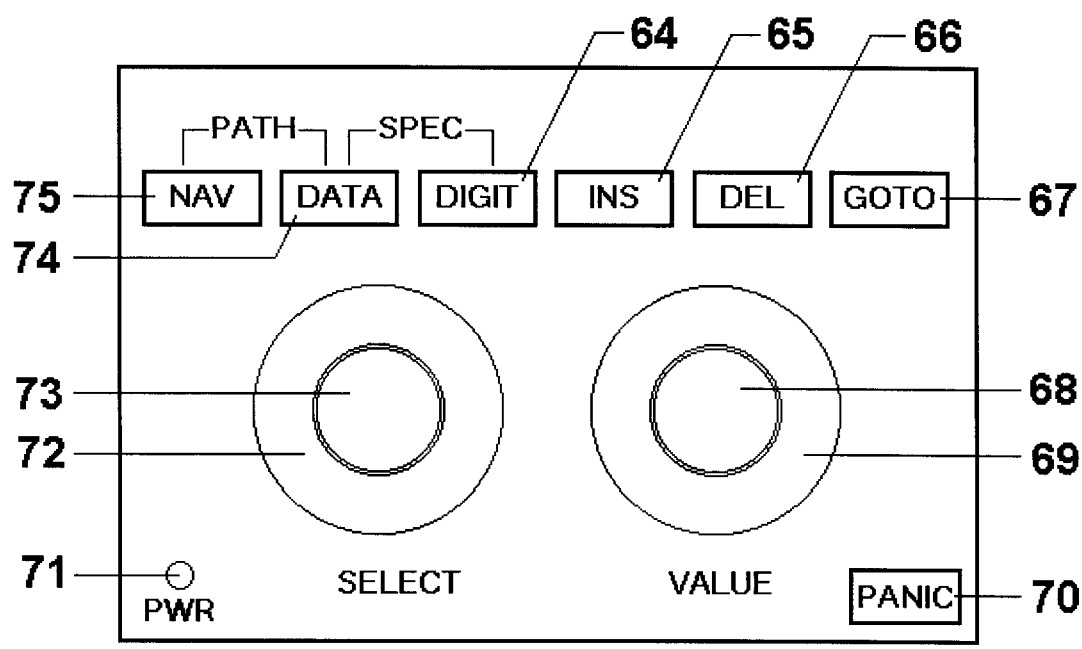
FIG. 7 illustrates the switch and dial panel in the present system. In a commercial version of the present system, this software prototype of the panel will be replaced by a hardware equivalent.
Figure 8:
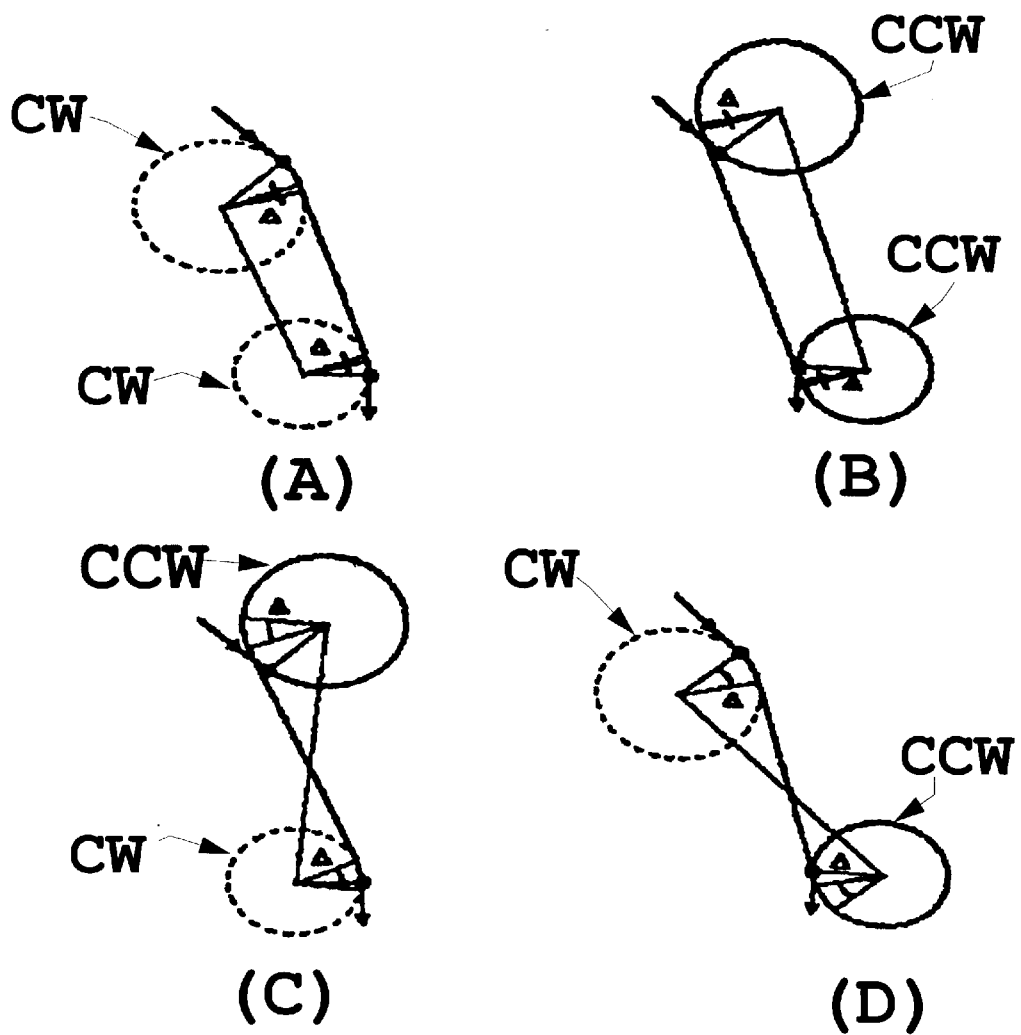
FIG. 8 shows the geometric construction used to calculate the four possible direct segments between two snapshots. The label CW stands for a clockwise arc. The label CCW stands for a counter-clockwise arc. The entry and exit points are indicated by dots near their associated arrows. The small triangle in each arc circle represents the delta angle that is described in the text.
Figure 9:
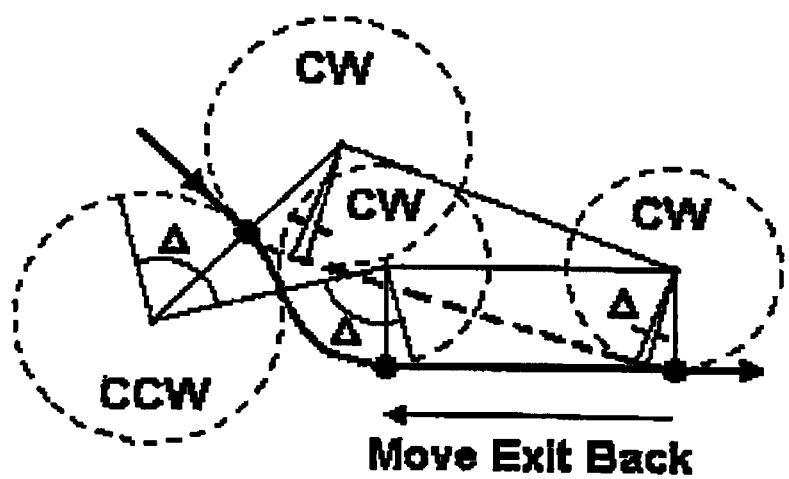
FIG. 9 shows the projection performed to derive a route segment from a direct segment. A route segment provides a shortened maneuver to position an aircraft on a specified linear path followed by travel along that path. A route segment is derived from a direct segment in FIG. 8 by moving the exit arc opposite to the exit direction and inserting an additional line element following the exit arc leading up to the exit snapshot.

The system also provides a Control panel which is shown in FIG. 7. The control panel is available in either a software version which appears on the system screen, or as a physical hardware version comprised of actual mechanical switches and push buttons. The hardware version is manufactured with ultra-reliable switches and push-buttons (selected from the aerospace industry technology). The software version of the control panel is operable by the pilot by manual selection of the items on the screen.

Control is accomplished by the use of 7 buttons, two pairs of rotary knobs, and a power/volume control. The Power/volume control (71) will apply power to the unit even when no power if available from the aircraft. This allows the system to have acquired the satellites and be functional prior to take off. The volume control on that same switch sets the audio level for marker beacons if the output to the audio system is utilized.

The NAV button (75) and the DATA button (74) are the principal controls to determine which display is using the Navigational Display window. Pressing NAV will always restore the Navigational Display. The DIGIT button (64) is used principally to switch between navigational aids sorted by distance and stepping through each letter of an alphabetic sort. The INS button (65) is used to insert data, which in turn depends on the particular window being used. Similarly the DEL button (66) is used to delete items selected by the software, such as waypoints or navigational aids. The GOTO button (67) activates specific functions, such as flight paths and automatic pilot. The PANIC button (70) will cause the pilot or autopilot to be directed to straight and level flight at a level at or above 2000 feet (adaptable) above the nearest airport.

Selections and data values are made by the use of two double rotary switches. The Outer Select knob (72) is used for main categories of functions. The Inner Select knob (73) is used for sub-categories of functions. The Outer Value knob (69) is used either to select from a large list or for entering a value of bearing. The stepping increment of the knob is speed dependent, allowing rapid movement through a large list. The Inner Value knob (68) is used either to select from a small list or entering a value of range. When entering values, this knob is also speed dependent.

The Aim Figure, shown in FIG. 4, not only reflects commands which would be sent to an autopilot, but also allows the pilot to imitate the autopilot if the autopilot hardware is not available.

Although there is some interaction between controls, we can define three primary controls for the aircraft. The primary control for turns is the ailerons, which causes the aircraft to bank. The primary control for speed is the elevator, which changes the aircraft's pitch, affecting both lift and drag. The operator controls the ailerons and the elevator by manipulating a flight controller. This flight controller is often referred to by pilots as the "yoke", which looks like a form of steering wheel. Some yokes also include the throttle control in its operation. In some aircraft, the Yoke is replaced by a "Joystick", with a separate throttle control. The primary control for climbing or descending is the throttle, which determines the amount of excess horsepower is applied to the propeller beyond that which is needed to support the weight of the aircraft and its occupants. The rudder is a secondary control used to coordinate turns. Turns in the air can be executed without the need for rudder control.

This invention provides a Flight Instrument Display having cross hairs placed vertically and horizontally on a circle. The circle, which is a standard "Compass Rose", is similar in size to a normal aircraft attitude indicator instrument, and is illustrated in FIGS. 2, 3, 4, and 5. The "Aim" figure on the display, shown in FIG. 3, is positioned horizontally from the cross hair proportional to the amount that the aircraft yoke should be moved left or right in order to steer the aircraft back onto its pre-defined or desired flight path, and vertically proportional to the amount the aircraft yoke should be moved forward or backward to achieve the same purpose. The "Aim" figure provides an extension vertically up or down indicating if the throttle should be increased or decreased. The "aim" figure also displays an indicator if a transition in direction, altitude, or speed is anticipated within the next few seconds by the flight path. A countdown is included when a transition requirement is imminent. The "aim" figure movements take into account the rate at which the aircraft should transition into and out of turns.

Note that once the system detects from the aircraft motion that the pilot has moved the control(s) the correct amount, the "aim" figure will move to the center of the cross hairs. It does not wait until the maneuver is complete. The pilot operates to keep the "aim" figure centered at all times and receives immediate feedback as to how closely corrections to flight directions are being followed. This greatly simplifies the pilot's task to keep the aircraft on the desired course.

Note also that the invention does not provide slip or skid information. A slip indicator, commonly used in aircraft is not needed as part of this invention. However, a simple bubble level may be located near the display to indicate this information, though most pilots can feel the coordinated turn by "the seat of their pants". This is one of the few senses that does not usually suffer from disorientation. Unlike the standard turn and slip indicator or rate-of-turn indicator, the invention does not require a slip indicator in order to maintain a standard rate turn.

If all possible flight paths were known to the system, the "aim" figure of this invention by itself would be sufficient and adequate for instrument flight. However, other instruments also provide confirmation that all is well. Deviations in flight path are made for traffic, weather, or pilot choice during a flight. If a specific flight path is not being flown, the "aim" figure need not be displayed. The invention includes representations of most of the instrument displays found in the majority of fixed wing aircraft. These instruments are enumerated in Table 1 and implementation of each will be described in the following paragraphs.

All computations indicated herein are calculated by the computer which is included in the present invention. Time for computer computation and implementation is short enough to allow 10 updates per second of graphic data and 1 update per second of alphanumeric data.

It is important to note that in this invention, the position sensor is used to determine all of the flight variables. While the use of the GPS for navigation is not new, the present invention makes use of special algorithms or computations which derive the aircraft performance solely from data supplied from the position sensor. In this respect, the invention is new and unique. For example, the wind vector, which is totally independent of the aircraft in that the wind vector is in air which is not coming from the aircraft, can be derived from changes in latitude and longitude as a function of time, as the aircraft follows a circular path of 360 degrees for one rotation.

The algorithms are solved by the on-board computer which is part of the instant invention, using a high level language selected from the group consisting of C++, Java, C, Ada, Fortran, Basic, Assembly, wherein C++ is the preferred language, in a computer having a processor with a speed of at least 100 MHZ. It should also be noted that computer languages are continuously being developed and the invention is not limited specifically to those languages or speed listed above. The primary function of the computer language is to solve the algorithms required by the invention.

Although this invention has been shown and described with respect to detailed embodiments thereof, it will be understood by those skilled in the art that various changes in form and detail of the computational and processor thereof may be made without departing from the scope of the claimed invention.

The display in this invention may be selected from CRT displays, Flat panel displays, Matrix displays, and Heads up displays, and the like. Said displays may be expressed in monochrome or color. Color displays have the advantage that specific elements, such as aircraft speed, may be emphasized.

In the equations that follow, units of measure have been included for clarity. The inventor recognizes that the implementation of this invention may use alternate units of measurement (e.g. meters instead of feet, degrees instead of radians) as may be appropriate.

In the equations used herein, term names are unique and will not be redefined when used again in later equations. The arc-tangent functions provide results from minus Pi to plus Pi, where Pi is the standard mathematical value; Pi=3.14159 whereby the sign of the numerator and the sign of the denominator are used to determine the quadrant of interest as is used in mathematics and understood by mathematicians.

Attitude Indicator

When flying on standard instruments, the pilot scan is generally centered on the attitude indicator. This important indicator provides an artificial horizon and indications and magnitude of pitch and bank. Many pilots learn to fly by using the attitude indicator as the primary instrument. In aircraft equipped with automatic pilots, the attitude indicator provides feedback to the control of the automatic pilot mechanism.

In this invention, the attitude indicator performance is modified from standard attitude indicators. Standard attitude indicators show the pitch and bank of the aircraft. True bank is only shown with this invention if the aircraft is in a coordinated turn. Otherwise the bank indication is proportional to the rate of turn at a given speed. This is much more useful information on aiding the pilot to control his aircraft. The attitude indicator will always be displayed.

A standard attitude indicator usually has a manual control to raise and lower the figure of an aircraft so that the pilot can set where the horizon should be for level flight. The cross hairs on the attitude indicator display of the present invention represent the present direction of travel. The artificial horizon moves relative to that direction of travel. The aircraft icon will position itself above the artificial horizon a distance proportional to the pitch of the aircraft. If the pilot chooses to manually offset the vertical position of the aircraft icon during flight, a small portion of each wing tip continues to show the calculated position and the icon moves, offset by the pilot setting.

The vertical scale is modified so that it appears normal at typical climb and descent rates, but will not exceed the maximum allowable value for vertical travel. The aircraft is positioned above the cross hairs according to its calculated pitch relative to the direction of travel. Constants for calculation of the pitch angle depend on the specific aircraft and are adjusted or calibrated for the aircraft being flown.

The bank of the aircraft in a coordinated turn is calculated by:

$$RateOfTurn = (HeadC - HeadP)/(Tc - Tp) \text{ radians per second} \quad (1)$$

$$Bank = \arctan(RateOfTurn \times GroundSpeed/g) \text{ radians} \quad (2)$$

where:
HeadC=current heading in radians as measured with respect to true north
HeadP=previous heading
Tc=current time
Tp=previous time
GroundSpeed=from equation (11)
g=acceleration of gravity=19.0645 nautical miles per second per second The vertical position of the artificial horizon show the glide slope relative to the cross hairs and is calculated by:

$$GlideSlope = \arctan(VerticalSpeed/(Kgl \times GroundSpeed)) \text{ radians} \quad (3)$$

where:
Kgl=glide slope warp constant
VerticalSpeed=from equation (13)

The vertical position of the aircraft relative to the artificial horizon is calculated by:

$$Pitch = Kpa + Kpb/AirSpeed^2 \qquad \text{radians} \quad (4)$$

where:
Kpa=first aircraft dependent pitch constant, pilot controlled
Kpb=second aircraft dependent pitch constant, aircraft dependent
AirSpeed=magnitude of the vector sum of the GroundSpeed and the wind vector Wind Vector The invention has no way of measuring instantaneous wind speed or wind direction directly, without the need for computation. However the pilot is provided with the options of 1) ignoring wind speed 2) manually entering a reported or estimated wind speed and direction, 3) manually entering the true airspeed and magnetic compass heading from aircraft instruments (computation is a simple vector subtraction from the ground speed-direction vector), or 4) flying a constant rate circle during which time the invention will calculate the wind vector from the drift data measured by the invention. These items are measured during the circular maneuver, and the wind vector is computed by the on-board computer, and displayed on the system display panel. With a constant rate turn, the wind vector is calculated by:

$$WindX = \left(\frac{LonF - LonS}{Tf - Ts}\right) \times \left(\frac{re}{2}\right) \times \cos\left(\frac{LatF + LatS}{2}\right) \text{ Kts} \quad (5)$$

$$WindY = \left(\frac{LatF - LatS}{Tf - Ts}\right) \times \left(\frac{re}{2}\right) \text{ Kts} \quad (6)$$

$$WindSpeed = \sqrt{WindX^2 + WindY^2} \text{ Kts} \quad (7)$$

$$WindDirection = \arctan(WindX/WindY) \text{ radians} \quad (8)$$

where:
re=radius of earth in nautical miles
LatS=start latitude in radians

LonS=start longitude in radians
LatF=finish latitude in radians
LonF=finish longitude in radians

Ground Speed

The ground speed may be supplied directly by the position sensor subsystem. The ground speed will always be displayed as a numerical value expressed in knots.

If not provided by the sensor sub-system, the speed and direction will be calculated using the following equations:

$$SpeedX = re \times \frac{LonC - LonP}{Tc - Tp} \times \cos\left(\frac{LatC + LatP}{2}\right) \text{ Kts} \quad (9)$$

$$SpeedY = re \times \frac{LatC - LatP}{Tc - Tp} \text{ Kts} \quad (10)$$

$$GroundSpeed = \sqrt{SpeedX^2 + SpeedY^2} \text{ Kts} \quad (11)$$

where:
LatP=previous latitude in radians
LonP=previous longitude in radians
LatC=current latitude in radians
LonC=current longitude in radians

Reading Indicator

The heading indicator in the present invention is an improvement over standard gyroscopic devices. The heading indicator provides a reading of the direction of motion of the aircraft rather than simply which direction the aircraft is pointing. The pilot has the option to select true or magnetic heading, and the choice made is indicated on the display. The current heading is displayed on a conventional compass rose which is located around the outer periphery of the attitude indicator and as a numeric display directly above the compass rose. The heading indicator is always displayed, but is only functional when the aircraft is in motion.

If direction is not supplied by the position sensor subsystem, then the heading is calculated by:

Heading=arctan(SpeedX/SpeedY)    radians (12)

If magnetic heading is desired, the magnetic deviation is added to the heading before it is displayed. All angles are displayed to the pilot as a numerical value in degrees from 0 degrees to 360 degrees.

Air Speed

Air speed is displayed graphically as a circle, whose radius is proportional to the air speed, is superimposed on the attitude indicator. In color displays, the air speed circle is displayed in RED for easy location. The use of a circle avoids confusion with other items on the display. Critical speeds such as maximum structural speed, maximum flap speed, and stall speed are also presented on the display. Where desired, colors may be used to emphasize the present air speed or other air speed limits. Airspeed is calculated by a vector addition of the ground speed equation 11), heading (equation 12), and the wind vector (equations 7 & 8). If a wind vector is not entered into or computed by the system, ground speed is shown.

Altimeter, Reporting Altimeter

The altimeter function is provided directly by the position sensor sub-system. The altitude is presented to the pilot as a numeric read out which is always displayed. The information is also made available to the transponder. Unlike conventional altimeters, the altitude presented is already corrected for atmospheric pressure and temperature. In the case of the reporting altimeter, there will need to be a modification to the transponder signal to alert air traffic control that they need not apply the barometric correction.

Rate of Climb Indicator

The rate of climb indicator is a numeric read out of vertical speed converted to feet per minute and is always displayed. The vertical speed is calculated by:

$$VerticalSpeed = \frac{AltC - AltP}{Tc - Tp} \text{ feet per second} \quad (13)$$

where:
AltC=current altitude in feet
AltP=previous altitude in feet

Rate-of-Turn Indicator, Turn and Slip Indicator

Both of these instruments normally provide an indication of a standard two-minute turn rate as well as coordination of turns. The invention attitude indicator display will include lines that represent standard rate turns in either direction. These lines will always be displayed and the attitude indicator will accurately show standard rate turns even if the turns are not coordinated.

Note that this invention standard rate turn differs from conventional standard rate turns in that the rate applies to the actual heading rather than the direction the airplane is pointing. This is an improvement over conventional flight instrumentation. The slope of the display lines is calculated by:

$$StdRateBank = \pm\arctan\left(\frac{\pi \times GroundSpeed}{60 \times g}\right) \text{ radians} \quad (14)$$

where:
π=the constant pi=3.14159

Clock

The clock function is provided directly by the position sensor sub-system. The time is presented to the pilot as a numeric read out which is always displayed.

ILS Indicators

Instrument Landing System (ILS) indicators normally consist of a flight path and glide slope. Actual systems are generally installed at larger airports. The glide slope is not available on these units when landing on the back course (the same ILS runway in the opposite direction). The invention system provides a graphic simulated full ILS for all runways included in the database. The display indicates whether the ILS is standard and if a glide slope would normally be available.

Most instrument approaches include a missed approach point and a missed approach altitude. When defined, the system will "announce" when these limits are crossed. The altitude limit for the announcement will be automatically adjusted for the estimated accuracy provided by the position sensor.

Learned Runway

A runway is defined in the invention system minimally by a threshold location and a direction. The pilot may define a new runway by selecting the Learned Runway function just prior to takeoff. At selection time, the system will record the location as the runway threshold. Another location will be captured automatically when the aircraft has traveled approximately 3000 feet from the threshold. The runway direction is calculated and recorded from these two data points.

Navigation Indicators

The advanced navigation features allow any known location in the system, including airports, marker beacons, fixes, non-directional beacons, Vector Omni Range (VOR) facilities, Area Navigation (RNAV) locations, or user defined latitude and longitude locations to be displayed with VOR or Automatic Direction Finder (ADF) information. RNAV locations may be defined relative to any non-RNAV or user defined location by an offset distance and direction. The graphic display shows a device tag placed in the appropriate heading next to the compass rose as shown in FIG. 3. If there is no Omni Bearing Selector (OBS) setting, the device looks like an ADF and is displayed as a line is drawn from the tag to the cross hair center. If an OBS is selected, the device looks like a VOR tilted toward the navigational aid location with the line being drawn from the tag toward the cross hairs but offset by an angle proportional to the angular difference from the OBS setting and the current radial. To avoid confusion, the TO-FROM flag is shown as an arrow on the OBS line.

Each tag is listed in a separate alphanumeric navigation table that provides the location identifier, current distance, current direction and the OBS setting, if any. In the case of an RNAV, the offset distance and direction from the identifier are illustrated. In the case of a user defined location, the latitude and longitude of the desired location are illustrated.

As the flight proceeds, the current distance and direction from the navigational aid are continually updated by the following computation.

$$DistX = re \times (LonC - LonNav) \times \cos\left(\frac{LatC + LatNav}{2}\right) \text{ NtMi} \quad (15)$$

$$DistY = re \times (LatC - LatNav) \text{ NtMi} \quad (16)$$

$$Distance = \sqrt{DistX^2 + DistY^2} \text{ NtMi} \quad (17)$$

where:
LatNav=latitude of navigational aid or user defined location in radians
LonNav=longitude of navigational aid or user defined location in radians Navigation Functions The navigation sub-system in the present invention has been designed to make flying simpler by allowing the pilot to act as an autopilot would. In operation, the pilot sees that the controls must be moved as indicated by the "aim" figure in order to maintain or return to a desired course (vertically, horizontally, and speed). All the pilot has to do is maintain or return to the desired course is to manipulate the aircraft yoke and throttle so that the "aim" figure moves to the center of the attitude indicator display and the "Aim" figure extension is minimized. This relocation of the "Aim" figure tells the pilot how to move the controls to achieve the desired flight path.

The navigation functions are geared toward driving the "aim" figure previously discussed. In addition, whenever following a path, the "bug" will point to the desired heading on the compass rose. All flight paths are multi-dimensional, defining latitude, longitude, altitude, as well as speed and direction of travel. The paths take into account the space required to make a turn and the maximum rate of climb or descent permitted by acceptable flying practice. The calculated paths are accurate enough to support the anticipation and countdown feature of the "Aim" figure.

Flight Path Generation

For the purpose of this discussion, we will define a flight "snapshot" as a point defined by latitude, longitude, altitude, speed and direction of travel. All of these points are derived from the GPS data.

Each flight path is made up of a series of segments. Each segment contains either three or four elements. An element may be a straight line, a left arc, or a right arc. A three element segment will contain a straight line between two arcs. A four element segment will have an additional straight line at the end of the segment. Each segment represents the solution to the problem of getting from either the current aircraft snapshot or the previous segments snapshot to the next desired snapshot.

The path of an aircraft between any two snapshots can always be represented by a figure containing two arcs connected by a straight line. Such a segment is defined as a direct segment. If an additional straight line is added to the end of a direct segment, we call that a route segment. As the name implies, we use a route segment if we want to intercept and then follow a given route. Flight paths in the invention system is comprised of inter-connected "direct segments" and/or "route segments". These path segments are defined below.

Direct Segment

Depending on the nearness and current direction and speed of the aircraft (or the previous snapshot), there may be up to four physically realizable direct segments that can connect the points of anticipated or planned flight. The system calculates each of the four possible segments. From those segments that are valid, the system selects the segment which has the shortest path to be incorporated in the overall desired flight path.

To fully define a segment in this invention, the centers of the entry and exit, the termination points of the arcs, and the angle traveled in each arc must be identified. To calculate a segment, first the centers of the four possible arcs are calculated. Project a construction line from the entry and exit points perpendicular to the direction of travel a distance equal to the radius of the aircraft turns. The construction used to calculate the four segments are illustrated in FIG. 6(*a*), (*b*), (*c*), and (*d*). The length and direction of the line connecting each entry arc center to each exit arc center are calculated.

Case 1 (FIGS. 7(*a*) and 7(*b*)) contains the segments in which entry and exit arcs rotate in the same direction. Case 2 (FIGS. 7(*c*) and 7(*d*)) contains the segments in which entry and exit arcs rotate in opposite directions. In Case 1, if the difference in the arc radii is greater than the length between the entry and exit arc centers, the arc circles are physically within each other and the segment is not valid. In Case 2, if the sum of the radii is greater than the length between the two arc centers, the arc circles overlap and the segment is not valid. If none of the four segment attempts is valid, then the entry arcs are modified to give them equal radii to the exit arcs and the process is repeated.

In all cases, a first approximation is made to the end points of the line segment by projecting a construction line perpendicular from each end of the line connecting the arc centers onto each arc. An angular correction, delta, is then made to these end points which is equal to the difference in direction between the line connecting the two arc centers and the tangents connecting the two arcs. This delta is calculated as:

$$Delta = \arcsin\left(\frac{Ra - Rb}{Length}\right) \text{ for Case 1 radians} \quad (18)$$

$$Delta = \arcsin\left(\frac{Ra + Rb}{Length}\right) \text{ for Case 2 radians} \quad (19)$$

where:
Ra=entry radius
Rb=exit radius
Length=distance between two arc centers

The arc length, in radians, is then calculated by combining entry or exit direction, direction of line between arc centers, tangent point on each arc, and pi/2. Whether each term is added or subtracted depends on the Class and arc direction. The line element ends and the line length are calculated by simple geometry from two arcs. The total length of the segment may then be found from:

$$SegmentLength = Line + Ra \times AngA + Rb \ast AngB \quad \text{feet} \quad (20)$$

where:
Line=length of line element
AngA=angle traveled in the entry arc
AngB=angle traveled in the exit arc

Route Segment

The route segment is derived from a direct segment. If the exit arc is more than pi/2, then the route line has zero length and the direct segment is used in place of the route segment. Once the direct segment has been calculated, the center of the exit arc is moved in a direction opposite to the exit direction until either the exit arc would become pi/2 or the straight line length of the direct segment approaches zero.

The current implementation does not reduce the segment size to its minimum when only minor direction changes are required. Instead, the exit arc is moved back by a distance whose element length is defined by the following equation:

$$FourthElementLength = Line \times \cos(AngB) - (Ra+Rb) \times (1-\sin(AngB)) \quad \text{feet} \quad (21)$$

The segment is then recalculated and then the fourth element length is added to the segment.

Use of Segments and Path

As an aircraft attempts to follow a path, the instructions given via the "aim" figure depend on the particular element of a segment that the aircraft is on and the calculated time until the next element. If the aircraft is on a curved segment, flexibility is given to the bank angle in order to return to the planned arc. If the aircraft is on a straight-line segment, a route segment is inserted to return to that straight line. The rate of turn into and out of an arc governs the position of the "aim" figure. If the time remaining in a planned segment (not a correction segment) is less than 10 seconds and the next planned element is a different type, a "next direction" indication appears on the "aim" figure and the seconds are counted down.

The invention system defines six types of airport approaches; 1) direct, 2) left in pattern, 3) right in pattern, 4) left 45 degree entry, 5) right 45 degree entry, and 6) IFk approach plate generated. The first five are canned patterns that are automatically rotated to match the runway direction and may be applied to any airport runway in the database, including learned runways. The sixth is generated from standard IER approach plate data.

When requested by the pilot, the invention will automatically generate a flight path from the aircraft current snapshot to land at either the nearest airport or a selected airport using one of these six patterns. The choice of runways will be presented to the pilot in an order of preference based on wind direction. If no wind vector is present, the order of preference is based on the nearest appropriate entry to the default pattern of each runway.

The invention system also generates 4 of the 6 standard types of search and rescue patterns found in the Coast Guard Auxiliary Air Operations Training Text; 1) parallel track, 2) creeping line, 3) expanding square, and 4) sector search. Each of these patterns is defined starting with type, center latitude, center longitude, altitude, and the desired space between tracks. The parallel track and creeping line are further defined by the direction of the major axis, length, and width. The expanding square is further defined by the width of the square and the start direction. The sector search is further defined by the diameter of the area and the angular spacing between legs.

The invention system provides the functions for the pilot to define a path, first naming it and then sequentially selecting a series of points. The points are selected from any system-known or user-defined locations and pilot specified altitudes. The pilot may also insert uploaded path information to represent either a part or the entire desired path. The system will then generate the path by calculating appropriate snapshots and then expanding them into segments. The pilot may modify any of the points before or during the flight to generate a new path.

The control and display subsystem of the present invention provides the function needed to automatically generate a path to an airport from a list of airports sorted in the order of distance from the aircraft. The pilot will also be given a choice to select from a list of runways for the selected airport. If a wind vector is currently defined in the system, the runway list will show upwind runways first.

The invention system provides a single button function to automatically generate a path that will direct the aircraft to straight and level flight at the current altitude and direction. While still in this mode, the pilot may select a new direction, altitude and/or speed.

The invention system will accept uploads of replacement data for the entire location information database. The system will also accept uploads of user defined location information. The system will accept uploads of pre-defined path information. The user defined location and path data is the same as would be entered by the pilot and is uploaded in standard American Standard Code for Information Interchange (ASCII) format.

What is claimed is:

1. We claim an electronic instrumentation system which comprises positioning sensors such as satellite global positioning system hardware and controlling software, said hardware and software being designed to provide a pilot of an aircraft with both manual and automatic control of his aircraft under any known weather conditions, including complete blindness to surrounding conditions and loss of conventional instrumentation and instrument power, said system being comprised of (a) a position determining device, (b) a graphic display, (c) a computer system, (d) software, (e) input connectors, (f) knobs, and (g) switches, wherein items (a) through (g) replace and/or supplement the conventional aircraft instrumentation on an instrument display, and thereby allow the aircraft pilot to maintain complete control of his aircraft, either by manual response to graphic direction as depicted on the graphical display screen or automatically, without the need for manual intervention, to follow either predefined paths and patterns as well as navigation by presently accepted methods and defined locations, said electronic instrumentation system further being capable of determining position and velocity relative to three dimensional locations of airports, fixes, conventional navigational aids, and user input locations, generating standard and non-standard approaches, flight paths and search patterns associated with the aforementioned locations, calculating current air speed and direction, as well as providing direct or partial replacements for conventional aircraft displays and instruments including attitude indicator, altimeter, reporting altimeter, rate of climb indicator, turn and slip indicator, heading indicator, rate-of-turn indicator, clock, marker beacon receiver, Distance Measuring Equipment (DME), Vector Omni Range (VOR), Area Navigation (RNAV), Automatic Direction Finder (ADF), Instrument Landing System (ILS), and Long Range Navigation (LORAN) without the use of any moving parts except knobs, switches and connectors.

2. The electronic instrumentation system of claim 1, wherein said system is implemented using a Global Positioning System (GPS) navigation system, may employ any position sensing system such as Differential Global Positioning System (DGPS), Wide Area Augmentation System (WAAS), Local Area Augmentation System (LAAS), or future systems as they are developed, and combinations thereof, which will provide at a minimum: time, latitude, longitude, and altitude position information and when available will also make use of derived data such as speed and direction.

3. The electronic instrumentation system of claim 2, wherein said system display indicator provides visual representation of aircraft status comprising: (a) the bank angle of the aircraft when in a coordinated turn with an artificial horizon which is positioned above or below a central horizontal line as a function of the climb or descent angle of the aircraft, (b) a small aircraft figure which is positioned above the center of the artificial horizon by a distance which is a function of the calculated pitch angle of the aircraft, (c) a variable radius circle indicating the current ground speed, (d) circles indicating each of the critical air speeds for the aircraft, (e) marks indicating the amount of bank in 15 degree increments, (f) marks indicating the bank needed for a standard rate turn, (g) a compass rose with the current actual direction of travel at the top position, (h) a user or flight-path controlled heading bug, (i) marker beacon "lights" for outer, middle, and inner markers, and (j) numeric displays showing ground speed, altitude, direction of travel, time, rate of climb, latitude, longitude, current direction of the heading bug, and position sensor status.

4. The electronic instrumentation system of claim 1, wherein said system is further capable of displaying simultaneously, at the operator's discretion, some or all of the information normally obtained by this system from each of the specified navigation devices.

5. The electronic instrumentation system of claim 4, wherein said system attitude display indicator will optionally display up to a specified number of direction vectors indicating the location label and the relative position of any Vector Omni Range (VOR), Area Navigation (RNAV), Automatic Direction Finder (ADF), intersection, airport, or user defined location, and if a radial Omni Bearing Selector (OBS) has been defined, the offset angle of the aircraft from the OBS radial.

6. The electronic instrumentation system of claim 5, wherein said system will further optionally display an alpha-numeric list of all selected locations separate from the instrument display, showing at a minimum a definitive label on the graphic display, identification, present direction, present distance, and optional OBS radial when specified.

7. The electronic instrumentation system of claim 1, wherein said system attitude display indicator will optionally display the glide slope and heading indicators of an ILS or airport runway and will provide the identifier of the Instrument Landing System (ILS) if an ILS is defined for that runway.

8. The electronic instrumentation system of claim 1, wherein said system attitude display indicator will optionally display a wind vector and a numeric wind speed and direction when entered by the pilot or when calculated by the system using either a controlled rate turn or operator entered magnetic heading and true air speed.

9. The electronic instrumentation system of claim 1, wherein said system will include flight-path functionality which will provide navigation assistance in Visual Flight Rules (VFR) weather and if approved by the Federal Aviation Administration (FAA), will enable flight even without visibility, down to the minimums specified by the FAA as noted on instrument approach procedures charts of U.S. Terminal Procedures.

10. The electronic instrumentation system of claim 1, wherein said system attitude display indicator will optionally display a selected element whose position shows the direction and amount to move the aircraft controls and which also includes a graphic indication as well as a numeric count down in anticipation of future control movements for flight-path following in order to manually control the aircraft, monitor the autopilot control, or do both when not all axis have autopilot control thereby enabling the pilot to simply act as autopilot by following an easily understood graphic display.

11. The electronic instrumentation system of claim 1, wherein said system will accept location point, location point updates, and either relative or absolute flight path information in an easy to understand textual form from an external source such as a portable Personal Computer (PC) which will allow generic and specified airport approaches, preplanned flight routes, and generic patterns, such as search and rescue, to be followed by the aircraft.

12. The electronic instrumentation system of claim 11, wherein said system will include a feature which will automatically generate a flight path to either the nearest airport or one selected from a list of near airports with either pre-defined or user selected standard left, standard right, direct, or IFR-like patterns taking into account the turn radius, flight characteristics, velocity of the aircraft, and altitude above sea level which is associated with the particular airport at which the landing is to be accomplished.

13. The electronic instrumentation system of claim 12, wherein said system will further include a feature whereby said system can automatically learn a new runway location by selecting the function just before takeoff so that a flight path may later be automatically generated to land at that facility.

14. The electronic instrumentation system of claim 13, wherein said system will further include a feature whereby said system can automatically generate a flight path which will bring the aircraft to level flight in the current direction.

* * * * *